(12) United States Patent
Jeon et al.

(10) Patent No.: US 12,291,617 B2
(45) Date of Patent: May 6, 2025

(54) MANUFACTURING METHOD FOR A COMPOSITE SHEET

(71) Applicants: HYUNDAI MOTOR COMPANY, Seoul (KR); KIA CORPORATION, Seoul (KR); UNIVERSITY-INDUSTRY COOPERATION GROUP OF KYUNG HEE UNIVERSITY, Yongin-si (KR)

(72) Inventors: Sung Wan Jeon, Suwon-si (KR); Jung Mok You, Yongin-si (KR); Kang Yun Lee, Suwon-si (KR)

(73) Assignees: HYUNDAI MOTOR COMPANY, Seoul (KR); KIA CORPORATION, Seoul (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 231 days.

(21) Appl. No.: 17/992,402

(22) Filed: Nov. 22, 2022

(65) Prior Publication Data

US 2023/0323056 A1 Oct. 12, 2023

(30) Foreign Application Priority Data

Apr. 12, 2022 (KR) .................. 10-2022-0045078

(51) Int. Cl.
*B29B 11/16* (2006.01)
*C08J 5/18* (2006.01)
(Continued)

(52) U.S. Cl.
CPC ............... *C08J 5/248* (2021.05); *B29B 11/16* (2013.01); *C08J 5/18* (2013.01); *C08L 63/00* (2013.01);
(Continued)

(58) Field of Classification Search
CPC ... C08J 5/248; C08L 2203/16; C08L 2205/16; B32B 5/24; B32B 5/261061; B32B 5/26
(Continued)

(56) References Cited

U.S. PATENT DOCUMENTS 10,669,390 B2 6/2020 Lapidot et al.
2005/0256262 A1* 11/2005 Hill .......................... C09D 7/43
524/702

(Continued)

FOREIGN PATENT DOCUMENTS

JP 2017095831 A 6/2017
JP 2020158764 A 10/2020
(Continued)

OTHER PUBLICATIONS

Endrina S. Forti et al., Transparent tempo oxidized cellulose nanofibril (TOCNF) composites with increased toughness and thickness by lamination; Cellulose; 2020; https://doi.org/10.1007/s10570-020-03107-8; 17 pp.

(Continued)

*Primary Examiner* — Seyed Masoud Malekzadeh
*Assistant Examiner* — Debjani Roy
(74) *Attorney, Agent, or Firm* — Lempia Summerfield Katz LLC

(57) ABSTRACT

A manufacturing method for a composite sheet having excellent rigidity, no shape deformation, and excellent transparency is disclosed. By laminating a film obtained by impregnating a composite resin on a wet cake including cellulose nanofibers and glycerol, rigidity and transparency (Continued)

may be maximized, and a flat and thick composite sheet may be provided.

13 Claims, 7 Drawing Sheets

(51) Int. Cl.
   *C08J 5/24* (2006.01)
   *C08L 63/00* (2006.01)
   *B29K 63/00* (2006.01)
   *B29K 201/00* (2006.01)

(52) U.S. Cl.
   CPC ...... *B29K 2063/00* (2013.01); *B29K 2201/08* (2013.01); *C08J 2363/00* (2013.01); *C08L 2203/16* (2013.01); *C08L 2205/16* (2013.01)

(58) Field of Classification Search
   USPC .................................................... 106/242
   See application file for complete search history.

(56) References Cited

U.S. PATENT DOCUMENTS

| | | | |
|---|---|---|---|
| 2010/0143701 A1* | 6/2010 | Zhu | B29C 70/081 |
| | | | 428/323 |
| 2014/0234640 A1* | 8/2014 | Kohno | B29C 55/12 |
| | | | 264/129 |
| 2016/0369078 A1 | 12/2016 | Lapidot et al. | |
| 2019/0118508 A1 | 4/2019 | Saito et al. | |
| 2021/0355289 A1 | 11/2021 | Hong et al. | |
| 2022/0098376 A1 | 3/2022 | Hong et al. | |
| 2022/0195669 A1 | 6/2022 | Hong et al. | |

FOREIGN PATENT DOCUMENTS

| | | | | |
|---|---|---|---|---|
| JP | 2021144220 A | 9/2021 | | |
| KR | 20210139010 A | 11/2021 | | |
| KR | 20220041323 A | 4/2022 | | |
| KR | 20220089239 A | 6/2022 | | |
| WO | 2015114630 A1 | 8/2015 | | |
| WO | WO-2020040289 A1 * | 2/2020 | ............. | C08J 5/248 |

OTHER PUBLICATIONS

Endrina Stefani Forti Suarez, Transparent tempo oxidized cellulose nanofibril (TOCNF) composites with increased toughness and thickness by lamination; Dissertation submitted to the Faculty of Purdue University; 2021; 112 pp.

Shin Young Park et al., Preparation of Transparent and Thick CNF/Epoxy Composites by Controlling the Properties of Cellulose Nanofibrils; Nanomaterials; 2020; doi:10.3390/nano10040625; 13 pp.

* cited by examiner

MANUFACTURING METHOD FOR A COMPOSITE SHEET

The present application claims priority to Korean Patent Application No. 10-2022-0045078, filed Apr. 12, 2022, the entire contents of which are incorporated herein for all purposes by this reference.

BACKGROUND

1. Technical Field

The present disclosure relates to a manufacturing method for a composite sheet having excellent rigidity, no shape deformation, and excellent transparency.

2. Description of the Related Art

Cellulose nanofibers are eco-friendly and have excellent transparency, mechanical properties (e.g., Young's modulus 6 to 14 GPa, ultimate tensile strength 130 to 300 MPa), lightweight, and low thermal expansion coefficient. Therefore, cellulose nanofiber is a promising eco-friendly nanomaterial that is in the spotlight in the field of products area where transparency is important. However, these cellulose nanofibers are difficult to apply to various applications due to their thinness. As the thickness of fiber increases, it is difficult to manufacture a flat sheet due to the occurrence of shrinkage and the like, and the rigidity of the sheet decreases.

SUMMARY

In view of the foregoing, the development of a cellulose nanofiber-based sheet with excellent transparency, rigidity, and a thick thickness is urgently required.

An objective of the present disclosure is to provide a manufacturing method for a composite sheet having excellent transparency.

Another objective of the present disclosure is to provide a manufacturing method for a composite sheet having excellent rigidity and that does not undergo shape deformation.

The objectives of the present disclosure are not limited to the objectives mentioned above. The objectives of the present disclosure should become clearer from the following description and are realized by means and combinations thereof described in the claims.

The manufacturing method of the composite sheet, according to the present disclosure, includes: obtaining a dispersion by mixing a cellulose nanofiber and glycerol; obtaining a wet cake by drying the dispersion; treating the wet cake with a solvent; obtaining a film by impregnating a wet cake treated with solvent with a composite resin including a thermosetting resin and a curing agent; and obtaining a composite sheet by laminating, pressing, and curing the film.

The cellulose nanofibers may be oxidized with 2,2,6,6,-tetramethylpiperidine-1-oxyl (TEMPO).

The dispersion may include the cellulose nanofiber and glycerol having a ratio of cellulose nanofiber to glycerol in a range of 2:1 to 6:1.

The wet cake may be obtained by drying the dispersion for 40 to 50 hours.

The wet cake may have a thickness in a range of 300 micrometers ($\mu m$) to 800 $\mu m$.

The wet cake may be in a semi-dried state.

The solvent may include ethanol, propanol, butanol, pentanol, hexanol, ethylene glycol, glycerol, acetone, or a combination thereof.

The thermosetting resin may include an epoxy resin, an unsaturated polyester resin, a vinyl ester resin, or a combination thereof.

The pressing may be performed at a pressure in a range of 100 kPa to 5 MPa.

The curing may be performed at a temperature in a range of 80° C. to 120° C. for 10 hours to 15 hours.

The composite sheet may include the cellulose nanofiber in an amount in a range of 40% to 60% by weight of the composite sheet.

The composite sheet may have a thickness in a range of 0.6 mm to 2.4 mm.

The composite sheet may have a transparency in a range of 66% to 85% at 600 nm.

The composite sheet may have a flexural strength in a range of 209 megapascal (MPa) to 273 MPa.

The present disclosure may provide a manufacturing method for a composite sheet having excellent transparency.

The present disclosure may provide a manufacturing method for a composite sheet having excellent rigidity and not undergoing shape deformation.

The effects of the present disclosure are not limited to the effects mentioned above. It should be understood that the effects of the present disclosure include all effects that can be inferred from the following description.

DETAILED DESCRIPTION

A single reference number is used for similar components. In the accompanying drawings, the dimensions of the structures are enlarged than the actual size for clarity of the present disclosure. Terms such as first, second, etc., may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. The singular expression includes the plural expression unless the context clearly dictates otherwise.

In this specification, the terms "include" or "have" should be understood to designate that one or more of the described features, numbers, acts, operations, components, or a combination thereof exist, and the possibility of addition of one or more other features or numbers, operations, components, or combinations thereof should not be excluded in advance. Also, when a part of a layer, film, region, plate, etc., is said to be "on" another part, this includes not only the case where it is "on" another part but also the case where another part is in the middle. Conversely, when a part of a layer, film, region, plate, etc., is said to be "under" another part, this includes not only cases where it is "directly under" another part but also a case where another part is in the middle.

Unless otherwise specified, all numbers, values, and/or expressions expressing quantities of ingredients, reaction conditions, polymer compositions, and formulations used herein contain all numbers, values and/or expressions in which such numbers occur in obtaining such values, among others. Because they are approximations reflecting various uncertainties in the measurement, it should be understood as being modified by the term "about" in all cases. In addition, when a numerical range is disclosed in this disclosure, this range is continuous and includes all values from the minimum to the maximum value containing the maximum value of this range unless otherwise indicated. Furthermore, when such a range refers to an integer, all integers, including the minimum value to the maximum value containing the maximum value, are included unless otherwise indicated.

Figure 1:
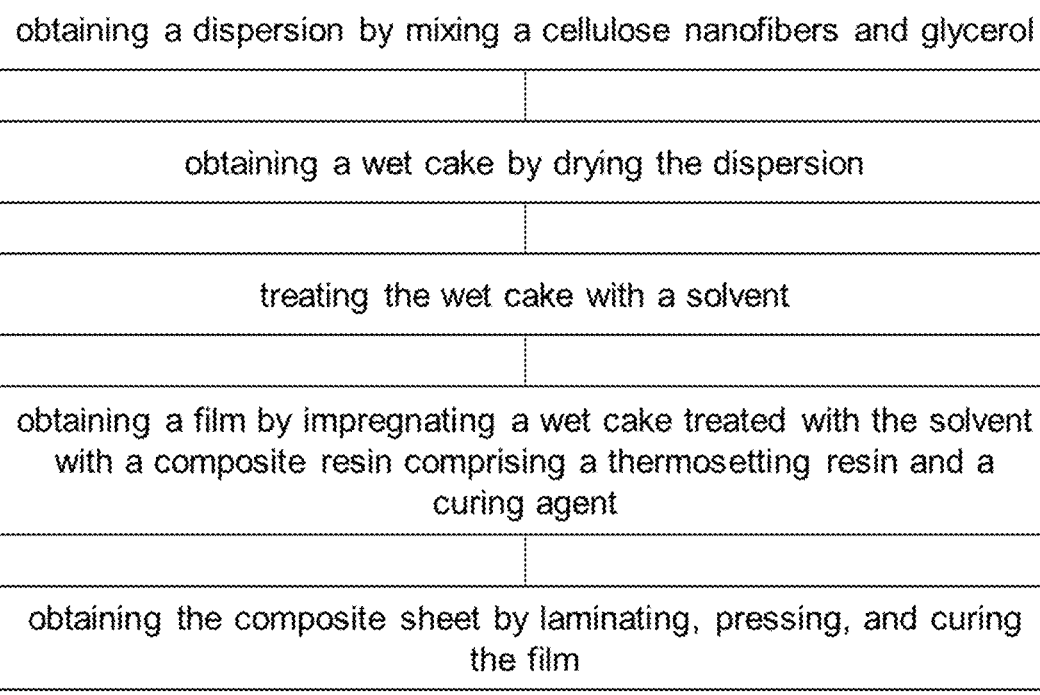
FIG. 1 shows a flowchart of an example of a manufacturing method for a composite sheet according to the present disclosure.

The present disclosure relates to a manufacturing method for a composite sheet having excellent transparency and rigidity. Hereinafter, the present disclosure is described in more detail with reference to the accompanying drawings. FIG. 1 shows a flowchart of a manufacturing method for a composite sheet according to the present disclosure.

Referring to FIG. 1, the manufacturing method of the composite sheet, according to the present disclosure, includes: obtaining a dispersion by mixing a cellulose nanofiber and glycerol (S10); obtaining a wet cake by drying the dispersion (S20); treating the wet cake with a solvent (S30); obtaining a film by impregnating a wet cake treated with the solvent with a composite resin including a thermosetting resin and a curing agent (S40); and obtaining the composite sheet by laminating, pressing, and curing the film (S50).

Obtaining a Dispersion by Mixing a Cellulose Nanofiber and Glycerol (S10)

Figure 2:
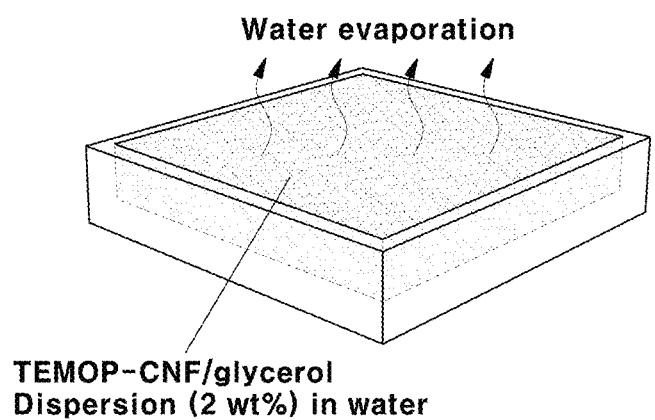
FIG. 2 shows step S10 of the present disclosure.

FIG. 2 shows step S10 of the present disclosure. Referring to FIG. 2, in step S10, dispersion may be obtained by mixing a cellulose nanofiber and glycerol. An important matter within the present disclosure is to make a thick wet cake without shrinkage before impregnating the composite resin. When glycerol, which is a small molecule, is mixed with a cellulose nanofiber, a hydrogen bond is formed. Therefore, glycerol is added because it is possible to prevent the wet cake from shrinking during drying. That is, by mixing the cellulose nanofiber and glycerol, glycerol can act as a softener, and a thick film can be obtained without shrinkage.

The cellulose nanofiber may be oxidized with 2,2,6,6-tetramethylpiperidine-1-oxyl (TEMPO). As described above, the cellulose nanofiber prepared by oxidation treatment with the TEMPO have a finer size as compared to general cellulose nanofiber. When the film is manufactured using such fine fibers, the strength of the film may be improved.

The dispersion may be obtained by adding glycerol to a dispersion of the cellulose nanofiber oxidized with TEMPO and stirring for 10 minutes to 1 hour.

The dispersion may include the cellulose nanofiber and glycerol having a ratio in a range of 2:1 to 6:1. In this case, when the ratio of the cellulose nanofiber is less than 2 (when the ratio of glycerol is increased), a space between the nanofiber is increased after the solvent substitution treatment due to excessive glycerol, and thus strength may be decreased. In addition, when the ratio of the cellulose nanofiber is more than 6 (when the ratio of glycerol is lowered), a shrinkage inhibition effect may not be properly exhibited during a drying process due to an insufficient amount of glycerol.

The step S10 may further include putting the dispersion obtained by mixing cellulose nanofibers and glycerol in a petri dish and removing microbubbles in a vacuum for 10 minutes to 1 hour. The above step is to secure uniformity by removing air bubbles.

Obtaining a Wet Cake by Drying the Dispersion (S20)

Figure 3:
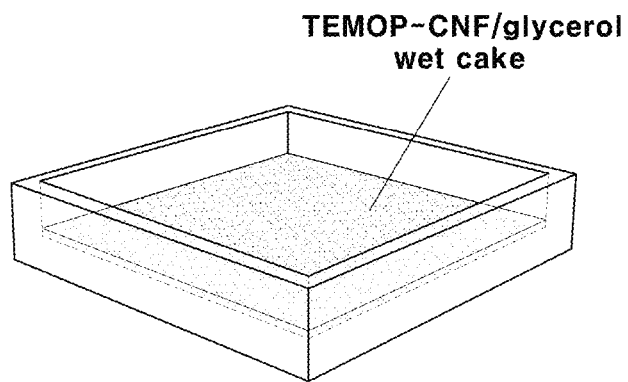
FIG. 3 shows step S20 of the present disclosure.

FIG. 3 shows step S20 of the present disclosure. Referring to FIG. 3, in step S20, a wet cake may be obtained by drying the dispersion.

The step S20 may be performed by drying at a temperature in a range of 30° C. to 50° C. in a constant temperature and humidity chamber having a humidity in a range of 80% to 100% for 40 hours to 60 hours. At this time, when the time is less than 40 hours, sufficient drying is not performed, and the space between the nanofiber is widened due to excessive moisture, which may cause a problem in that mechanical strength is lowered. In addition, when the time exceeds 60 hours, energy consumption occurs and economic feasibility is lowered, and if left unattended for a long time, there may be a problem that shrinkage occurs from the edge of the wet cake.

The wet cake that has undergone the above process may be in a semi-dried state. In the present disclosure, a semi-dried state means a semi-solid state due to the addition of glycerol, although all the solvents of the dispersion have been evaporated. In the case of complete drying rather than semi-drying, the shrinkage of the wet cake, including the cellulose nanofiber, may occur, and there may be a problem that the impregnation of the solvent is not easy in the next step of treating the wet cake with a solvent.

The wet cake may have a thickness in a range of 300 μm to 800 μm. At this time, when the thickness is less than 300 μm, the number of laminations to reach the target thickness is excessively large, which may cause a problem in that economic efficiency is lowered. In addition, when the thickness exceeds 800 μm, there may be a problem that the epoxy resin is not sufficiently immersed in the inside of the wet cake.

Treating the Wet Cake with a Solvent (S30)

Figure 4:
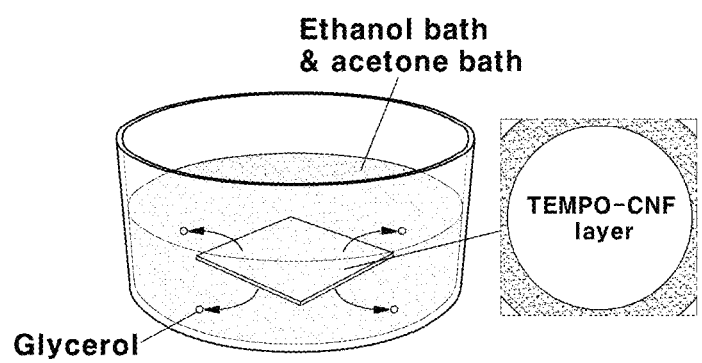
FIG. 4 shows step S30 of the present disclosure.

FIG. 4 shows step S30 of the present disclosure. Referring to FIG. 4, in step S30, the wet cake may be treated in a solvent substitution method.

The term of "solvent substitution method" may mean that treating the wet cake with a specific solvent. For example, the wet cake may be immersed in the specific solvent.

Step S30 is a step of rearranging the arrangement between the cellulose nanofiber included in the wet cake and uniformly generating open pores between the fibers by staying the wet cake in a specific solvent by substituting with a specific solvent to remove glycerol. If glycerol may be completely removed, the mechanical properties may be enhanced.

The cellulose nanofiber included in the wet cake are easy to deform and has strong cohesive force, which can lead to closed pores between the fibers as their size increases. Accordingly, because compatibility with the composite resin as a polymer is poor, it may be difficult to penetrate the composite resin between pores or irregularly penetrated between pores in the process of impregnating the composite resin in the wet cake. As a result, it may be derived that as the fiber size becomes coarsening (equal to or greater than 100 nm), a problem of deteriorating optical properties occurs. In order to solve this problem, treating with the solvent substitution method of the present disclosure is characterized as a pretreatment step that can suppress the cohesive force between the fibers and allow the composite resin to sufficiently and uniformly penetrate into the pores between the fibers later.

According to the present disclosure, solvent substitution may treat the wet cake with a specific solvent. The specific solvent is a commonly known solvent that can be used in the present disclosure, for example, may include ethanol, propanol, butanol, pentanol, hexanol, ethylene glycol, glycerol, acetone, or a combination thereof, but not limited to a specific component. In one particular embodiment, the solvent may be ethanol and acetone.

The treatment with the solvent substitution method in step S30 may be performed one or more times with one or more solvents. For example, after performing the first solvent substitution with ethanol twice for 4 hours to 8 hours, the second solvent substitution may be performed with acetone twice for 1 hour to 5 hours.

The reason for the first solvent substituting with ethanol is also for the purpose of removing glycerol. This is because if glycerol remains, the mechanical strength is lowered. After that, the reason for the second solvent substituting with acetone is also to increase the solvent affinity between Bisphenol A diglycidyl ether (DGEBA) and the epoxy resin.

In this case, when the first solvent substitution is less than 4 hours, the solvent substitution is not completely performed, and thus glycerol is not completely removed, and when the first solvent substitution is more than 8 hours, economic efficiency may be degraded due to an excessive residence time.

In addition, if the second solvent substitution is less than 1 hour, there is a problem in that the solvent substitution is not performed completely.

Obtaining a Film by Impregnating a Wet Cake Treated with the Solvent with a Composite Resin Including a Thermosetting Resin and a Curing Agent (S40)

Figure 5:
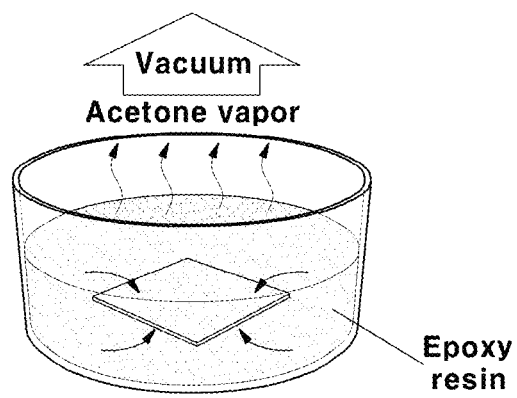
FIG. 5 shows step S40 of the present disclosure.

FIG. 5 shows step S40 of the present disclosure. Referring to FIG. 5, in step S40, a film may be obtained by impregnating the wet cake subjected to solvent substitution method with a composite resin, including a thermosetting resin and a curing agent.

The composite resin is a commonly known transparent composite resin that can be used in the present disclosure and includes, for example, a thermosetting resin and a curing agent, and may further include a catalyst. The thermosetting resin includes an epoxy resin, an unsaturated polyester resin, a vinyl ester resin, or combinations thereof. In one particular embodiment, the thermosetting resin is an epoxy resin. In addition, the catalyst may be 1-methylimidazole or the like.

The composite resin may include 100 parts by weight of the thermosetting resin, 90 parts by weight to 100 parts by weight of the curing agent, and 0.1 parts by weight to 2 parts by weight of the catalyst. At this time, when the curing agent is less than 90 parts by weight or exceeds 100 parts by weight, there is a problem in that the curability of the thermosetting resin is weakened. In addition, when the amount of the catalyst is less than 0.1 parts by weight, there is a problem in that the curability of the thermosetting resin is weakened, and when the amount of the catalyst exceeds 2 parts by weight, there is a problem in that economic efficiency is lowered.

In step S40, the wet cake may be impregnated with the composite resin in a vacuum for 30 minutes to 90 minutes.

Obtaining the Composite Sheet by Laminating, Pressing, and Curing the Film (S50)

Figure 6:
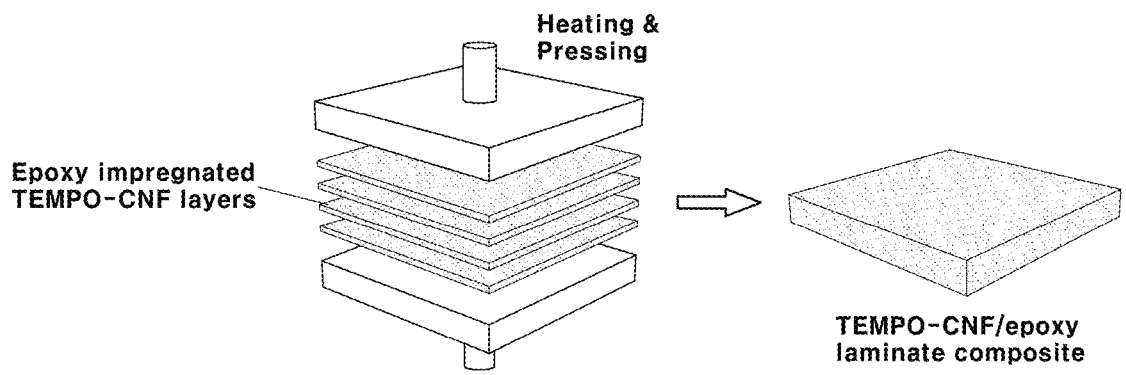
FIG. 6 shows step S50 of the present disclosure.

FIG. 6 shows step S50 of the present disclosure. Referring to FIG. 6, in step S50, the composite sheet may be obtained by laminating, pressing, and curing the film according to the present disclosure.

In the present disclosure, pressing, and curing may be performed simultaneously.

In step S50, for example, the film may be laminated in 1 to 20 layers, or 2 to 15 layers. At this time, when laminating in less than 2 layers, the target thickness may not be reached, and a problem of flexibility may occur. In addition, when laminating exceeds 15 layers, a problem in that the modulus is lowered and the transparency is lowered may occur.

The films may have the same thickness or different thicknesses.

In step S50, a laminated film may be put between the polymer sheets and pressed and cured. At this time, the reason for using the polymer sheet is to prevent the thermosetting resin from sticking to the presser, so it is advantageous to use a polymer sheet that does not bind to a thermosetting resin, for example, an epoxy resin.

The polymer sheet is a commonly known transparent polymer sheet that can be used in the present disclosure, but transparency is irrelevant because it only serves as a shell that prevents it from sticking to the presser. As the polymer sheet, for example, may include polypropylene, Teflon (PTFE), or a combination thereof. In one particular embodiment, the polymer sheet is polypropylene.

In step S50, pressurization may be performed at a pressure in a range of 100 kPa to 5 MPa. At this time, when the pressure is less than 100 kPa, there is a disadvantage that the laminated films do not adhere to each other, and thus structurally, the thickness becomes non-uniform, and when the pressure exceeds 5 MPa, the shape of the film is broken.

According to the present disclosure, the film may be cured at a temperature in a range of 80° C. to 120° C. for 10 hours to 15 hours. At this time, when the temperature is 80° C. and the curing time is less than 10 hours, there is a disadvantage that the curability is weakened, when the temperature is 120° C. and the curing time exceeds 15 hours, there is a disadvantage in that the color is faded.

A Composite Sheet

The composite sheet, according to the present disclosure, may include an amount in a range of 40% to 60% by weight of the cellulose nanofiber. As in the present disclosure, when the cellulose nanofiber content exceeds 40%, the proportion of eco-friendly bioplastics derived from nature is increased, and mechanical strength may be increased.

The composite sheet may have a thickness in a range of 0.6 mm to 2.4 mm.

The composite sheet may have a transparency in a range of 66% to 85% at 600 nm.

The composite sheet may have a flexural strength in a range of 209 MPa to 273 MPa.

Hereinafter, the present disclosure is described in detail with reference to the following Examples and Comparative Examples. However, the technical spirit of the present disclosure is not limited or limited thereto.

EXAMPLES 1 TO 4 AND COMPARATIVE 1

Figure 7:
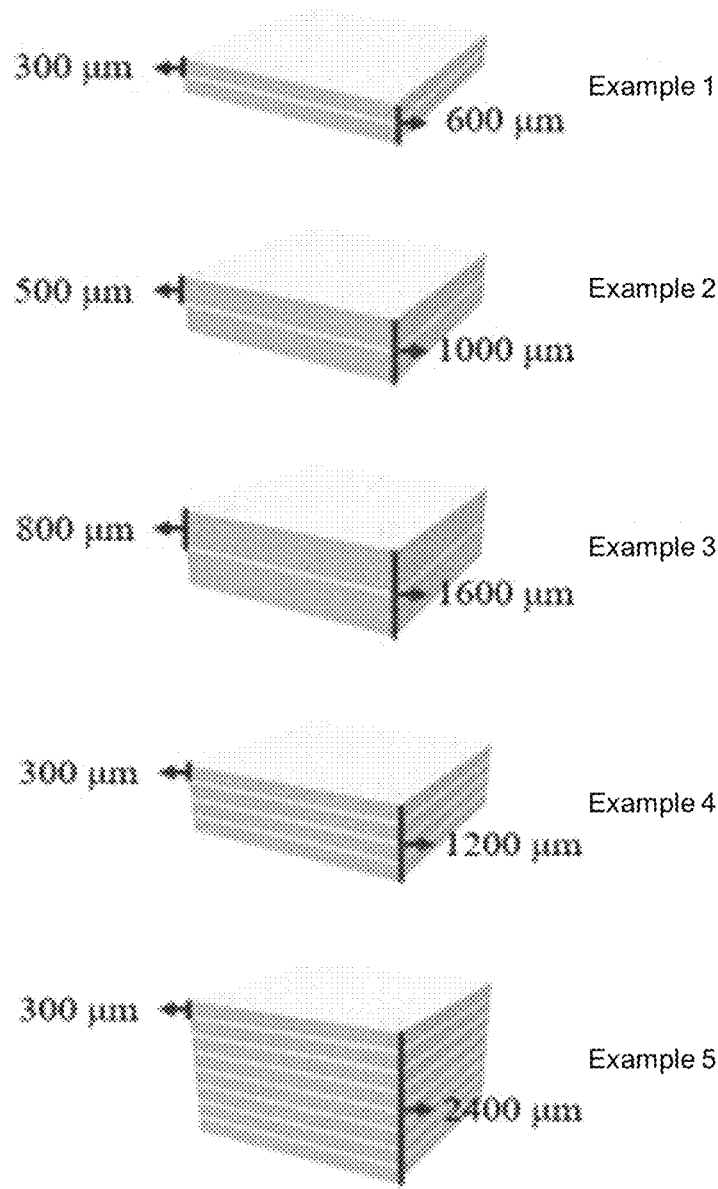
FIG. 7 shows a diagram of an embodiment.

Examples and Comparative Examples were prepared by the following method. FIG. 7 shows a diagram of an embodiment.

Example 1

1) After adding 0.1 g of glycerol to 20 mL of 2 wt. % TEMPO-treated cellulose nanofiber dispersion, stir for 30 minutes to prepare a dispersion (TEMPO-CNF: glycerol=4:1). The dispersion was placed in a 60 mm petri dish, and microbubbles were removed in a vacuum for 30 minutes.

2) This was dried at a temperature of 40° C. and a humidity of 90% in a constant temperature and humidifier for more than 48 hours to obtain a wet cake.

3) The wet cake in a semi-dried state was subjected to a first solvent substitution treatment with ethanol twice for 6 hours, followed by a second solvent substitution treatment with acetone solution twice for 3 hours.

4) Epoxy resin (KDS-8128), curing agent (RIKACID MH-700G), and catalyst (1-methylimidazole) were stirred at a weight ratio of 100:94:1 for 5 minutes to prepare a composite resin, and the wet cake was impregnated with the composite resin to prepare a 300 μm thick film.

5) After laminating 2 sheets of the above films, they were placed between clear polypropylene plates and pressed under a pressure of 500 kPa so as to adhere to each other and cured in an oven at 100° C. for 12 hours to obtain a 600 μm thick of composite sheet.

Example 2

Example 2 was obtained in the same method as in Example 1, except that 0.2 g of glycerol was used in 40 mL of the TEMPO-treated cellulose nanofiber dispersion in 1) of Example 1 preparation, and 500 μm thick of 2 films were laminated, pressed, and cured to obtain a 1000 μm thick composite sheet.

Example 3

Example 3 was obtained in the same method as in Example 1, except that 0.3 g of glycerol was used in 60 mL of the TEMPO-treated cellulose nanofiber dispersion in 1) of Example 1 preparation, and 800 μm thick of 2 films were laminated, pressed, and cured to obtain a 1600 μm thick composite sheet.

Example 4

Example 4 was obtained in the same method as in Example 1, except that 4 films were laminated in 5) of Example 1 preparation, and 300 μm thick of 4 films were laminated, pressed, and cured to obtain a 1200 μm thick composite sheet.

Example 5

Example 5 was obtained in the same method as in Example 1, except that 8 films were laminated in 5) of Example 1 preparation and 300 μm thick of 8 films were laminated, pressed, and cured to obtain a 2400 μm thick composite sheet.

Comparative Example 1

A composite resin was obtained by stirring an epoxy resin (KDS-8128), a curing agent (RIKACID MH-700G), and a catalyst (1-methylimidazole) in a weight ratio of 100:94:1 for 5 minutes. After transferring to a mold with a thickness of 2 mm, air bubbles were removed. It was cured in an oven at 100° C. for 12 hours to obtain a 2 mm thick sheet composed of neat epoxy.

Experimental Example 1: Stiffness Measurement

The physical properties of the composite films obtained in Examples 1 to 3 and Comparative Example 1 were measured. The results are shown in Table 1 and FIG. 8.

TABLE 1

| | Flexural Strength (MPa) | Flexural Modulus (GPa) | Density (g/cm$^3$) |
|---|---|---|---|
| Comparative Example 1 | 98 | 3.2 | 1.150 |
| Example 1 | 225 | 15.2 | 1.310 |
| Example 2 | 234 | 13.2 | 1.287 |
| Example 3 | 166 | 10.5 | 1.283 |

Figure 8:
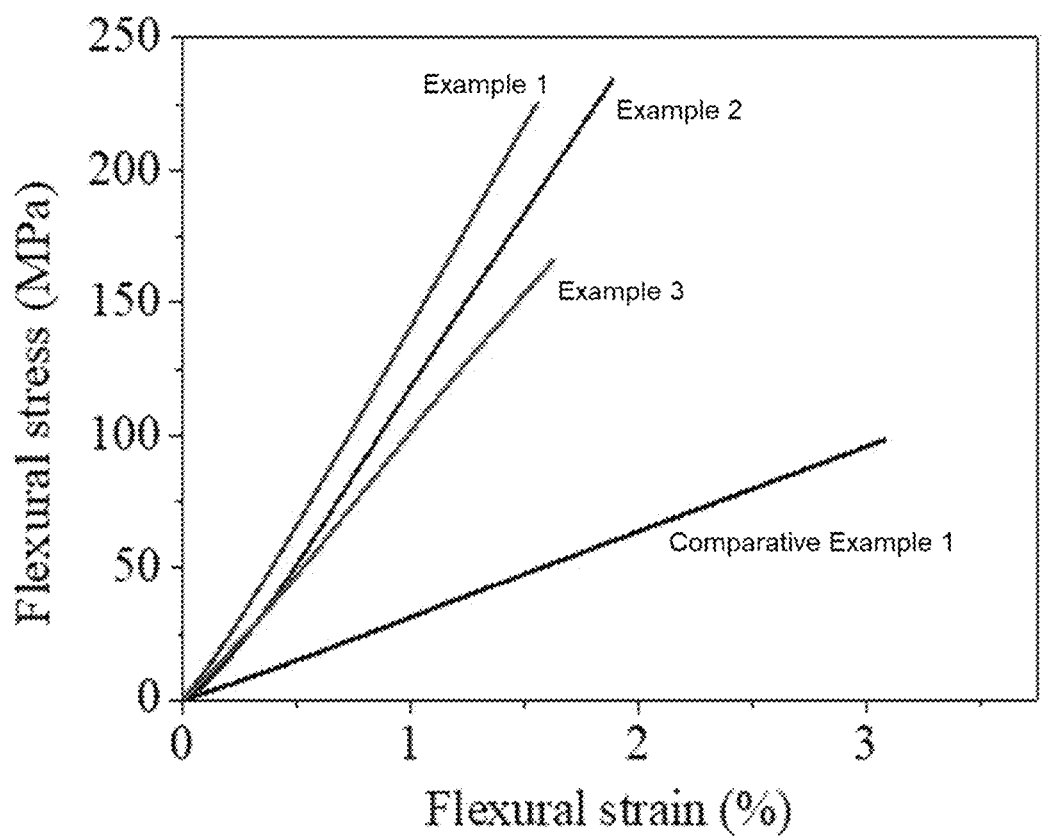
FIG. 8 shows the results of the flexural strength measurement experiment of Examples and Comparative Examples.

FIG. 8 shows the results of the flexural strength measurement experiment of Examples and Comparative Examples. Referring to Table 1 and FIG. 2, the flexural strength, flexural modulus, and density of Examples 1 to 3 of the present disclosure are significantly higher than Comparative Example 1 composed only of epoxy.

Experimental Example 2: Transparency Retention

The transparency retention of the composite films prepared in Examples 1, 4, and 5 were measured. The results are shown in FIG. 9.

Figure 9:
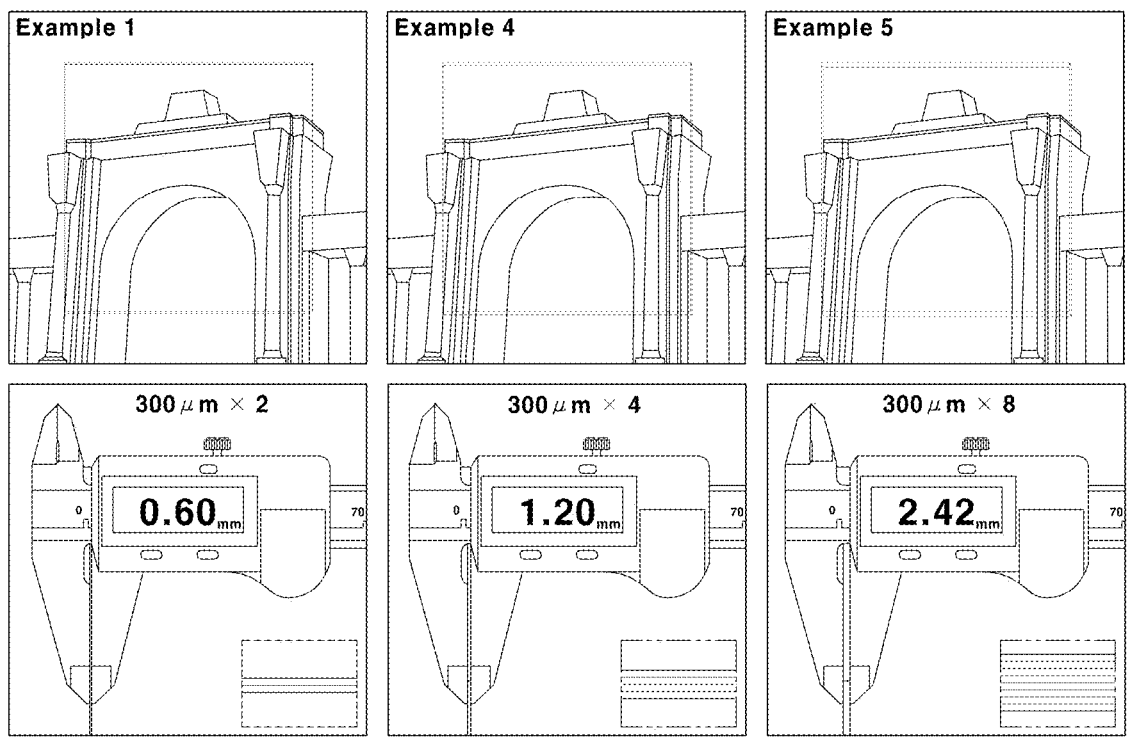
FIG. 9 shows a transparency maintenance measurement experiment according to Examples of the present disclosure.

FIG. 9 shows a result of a transparency maintenance measurement experiment according to Examples of the present disclosure. Referring to FIG. 9, the transparency is maintained even when the thickness is increased.

Experimental Example 3: Transmittance Measurement

The transmittance of the composite films obtained in Examples 1, 4, and Comparative Example 1 was measured. The results are shown in FIG. 10.

Figure 10:
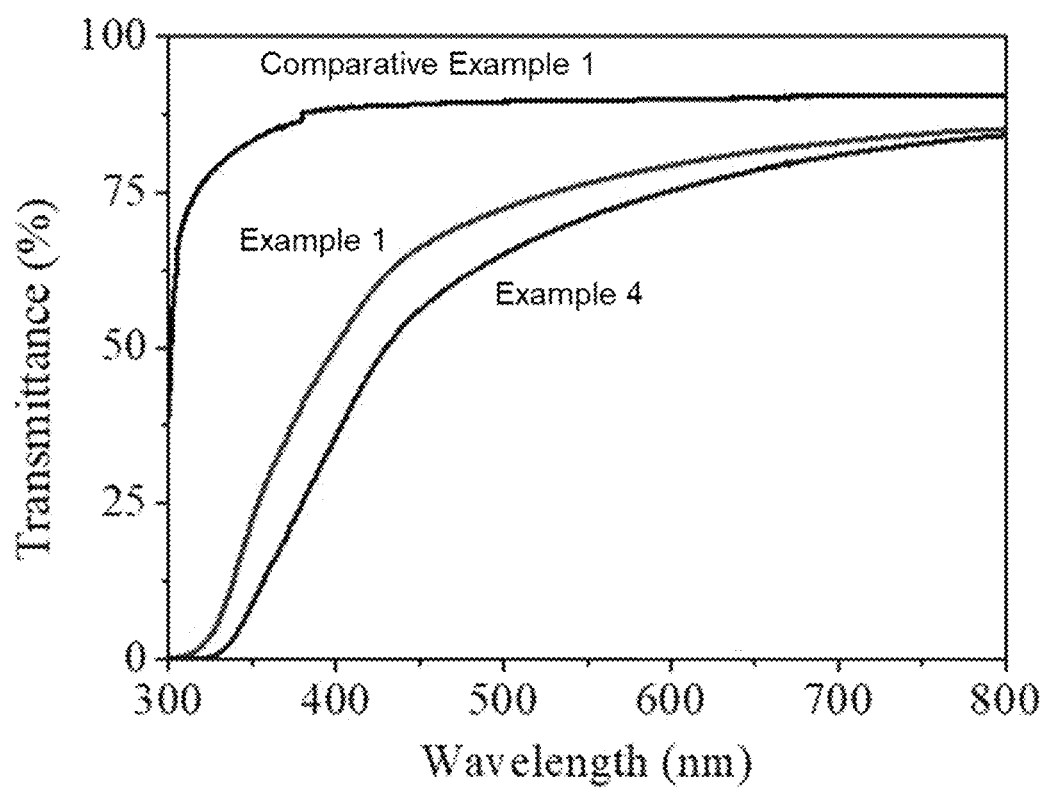
FIG. 10 shows the transmittance measurement experimental results of Examples and Comparative Examples.

FIG. 10 shows a graph of the transmittance measurement experimental results of Examples and Comparative Examples. Referring to FIG. 10, the transmittance at a visible light wavelength is high, and the transmittance is low at an ultraviolet wavelength.

Therefore, the manufacturing method for a composite sheet, according to the present disclosure, may maximize rigidity and transparency and provide a flat and thick composite sheet by laminating a film obtained by impregnating a composite resin on a wet cake including the cellulose nanofiber and glycerol.

Although the Examples of the present disclosure has been described above, the present disclosure may be implemented in other specific forms without changing the technical spirit or essential features thereof. Therefore, it should be understood that the embodiments described above are illustrative in all respects and not restrictive.

What is claimed is:

1. A manufacturing method for a composite sheet, the method comprising:
    obtaining a dispersion by mixing a cellulose nanofiber and glycerol;
    obtaining a wet cake by drying the dispersion;
    treating the wet cake with a solvent to obtain a treated wet cake;
    obtaining a film by impregnating the treated wet cake with a composite resin comprising a thermosetting resin and a curing agent; and
    obtaining the composite sheet by laminating, pressing, and curing the film,
    wherein the wet cake is obtained by drying the dispersion for 40 hours to 60 hours in a chamber having a humidity in a range of 80% to 100%, and wherein the wet cake is treated by substituting the glycerol with the solvent, and the glycerol is removed.

2. The method of claim 1, wherein the cellulose nanofiber is oxidized with 2,2,6,6,-tetramethylpiperidine-1-oxyl (TEMPO).

3. The method of claim 1, wherein the dispersion comprises the cellulose nanofiber and the glycerol having a ratio in a range of 2:1 to 6:1.

4. The method of claim 1, wherein the wet cake has a thickness in a range of 300 μm to 800 μm.

5. The method of claim 1, wherein the wet cake is in a semidried state.

6. The method of claim 1, wherein the solvent comprises ethanol, propanol, butanol, pentanol, hexanol, ethylene glycol, glycerol, acetone, or any combination thereof.

7. The method of claim 1, wherein the thermosetting resin comprises an epoxy resin, an unsaturated polyester resin, a vinyl ester resin, or any combination thereof.

8. The method of claim 1, wherein the pressing is performed at a pressure in a range of 100 kPa to 5 MPa.

9. The method of claim 1, wherein the curing is performed at a temperature in a range of 80° C. to 120° C. for 10 hours to 15 hours.

10. The method of claim 1, wherein the composite sheet comprises the cellulose nanofiber in an amount in a range of 40% to 60% by weight.

11. The method of claim 1, wherein the composite sheet has a thickness in a range of 0.6 mm to 2.4 mm.

12. The method of claim 1, wherein the composite sheet has a transparency in a range of 66% to 85% at 600 nm.

13. The method of claim 1, wherein the composite sheet has a flexural strength in a range of 209 MPa to 273 MPa.

* * * * *